United States Patent [19]

Serpico et al.

[11] Patent Number: 5,677,074
[45] Date of Patent: Oct. 14, 1997

[54] GAS DIFFUSION ELECTRODE

[75] Inventors: Joseph M. Serpico, East Greenbush; Scott G. Ehrenberg, Fishkill; Gary E. Wnek, Latham, all of N.Y.; Timothy N. Tangredi, Palm Harbor, Fla.

[73] Assignee: The Dais Corporation, Palm Harbor, Fla.

[21] Appl. No.: 673,661

[22] Filed: Jun. 25, 1996

[51] Int. Cl.$^6$ .................. H01M 4/92; H01M 8/10
[52] U.S. Cl. .................. 429/43; 429/33; 429/42
[58] Field of Search .................. 429/42, 43, 33

[56] References Cited

U.S. PATENT DOCUMENTS

| | | | |
|---|---|---|---|
| 3,423,246 | 1/1969 | Prager et al. | 136/120 |
| 3,892,592 | 7/1975 | Fukuda et al. | 136/120 |
| 4,447,505 | 5/1984 | Blanchart | 429/42 |
| 4,876,115 | 10/1989 | Raistrick | 427/115 |
| 4,975,172 | 12/1990 | Yeager et al. | 204/283 |
| 5,126,031 | 6/1992 | Gordon et al. | 204/242 |
| 5,316,871 | 5/1994 | Swathirajan et al. | 429/33 |
| 5,453,332 | 9/1995 | Sakairi et al. | 429/40 |

FOREIGN PATENT DOCUMENTS

| | | |
|---|---|---|
| 48-43269 | 12/1973 | Japan . |
| 7607469 | 1/1978 | Netherlands . |

*Primary Examiner*—John S. Maples
*Attorney, Agent, or Firm*—Heslin & Rothenberg, PC

[57] ABSTRACT

A gas diffusion electrode for an electrochemical cell and a fuel cell employing the electrode are disclosed. The electrode includes a porous body in contact with a catalyst layer comprising (i) a catalyst dispersed on the surface of a carbon support; (ii) a water-insoluble sulfonated polystyrene, poly(α-methylstyrene) or SEBS block copolymer; and (iii) a nonionic fluorocarbon polymer. The fuel cell includes two of the foregoing electrodes and a membrane of a proton-conducting polymer between the electrodes. It also includes an inlet for a gaseous fuel, an inlet for an oxygen-containing gas, and an outlet for reaction products.

12 Claims, 1 Drawing Sheet

GAS DIFFUSION ELECTRODE

FIELD OF THE INVENTION

The invention relates to a gas diffusion electrode for an electrochemical cell. The electrode comprises a porous body in contact with a catalyst layer of a particular composition.

BACKGROUND OF THE INVENTION

Gas diffusion electrodes are used in electrochemical cells in order to achieve high current density. The porous nature of the electrodes facilitates the efficient utilization of gaseous reactants and the efficient expulsion of products of the electrochemical reactions that produce electric power.

Fuel cells utilizing an acidic polymer electrolyte membrane and consuming a fuel (e.g. hydrogen or methane) at the anode and an oxidant (oxygen or air) at the cathode produce a net current in an external electric circuit when the fuel cell is subject to a load. The electrochemical processes which occur within the porous gas diffusion electrodes in the context of a fuel cell may be described as follows: At the anode, hydrogen is fed into the diffusion backing of the electrode and into the catalyst layer, where diatomic hydrogen is dissociated to produce protons and electrons. The electrons travel through an external electrical circuit. The protons migrate within the anode, cross the interface between the catalyst layer and an adjacent polymer electrolyte and are shuttled across a membrane to participate in a reaction at the cathode. The membrane separates the halves of the cell and is permeable only to protons. At the cathode, air (or any source of oxygen) is fed into the diffusion backing of the electrode and thence into the catalyst, where diatomic oxygen is reduced by the acceptance of electrons from the external circuit and subsequently reacts with protons to produce water, which can be in the liquid or gaseous form, depending on the operating conditions of the cell.

Conventional fuel cell electrodes are routinely employed in high temperature (>90° C.) cells because the rate of the electrochemical reactions that are responsible for producing useful power increases with temperature. However, in such a system the additional heat required to maintain the elevated temperature must be supplied from a heater, which requires that parasitic power be drawn from the fuel cell. This significantly reduces the net power output (by up to 20%). A more desirable electrode would provide high current density even when operating at 25° to 50° C., a temperature range that is sustainable from the excess heat generated by the electrochemical reactions alone.

A practical and acceptable fuel cell should perform effectively with ambient air. The need to provide air under pressure (or worse yet, the need to provide pure oxygen) in order to achieve high efficiency is a major drawback of many known electrodes and fuel cells. In order to utilize ambient air, the cathode must be able to operate with a gas stream that is about 20% oxygen with the remainder being, at best, an inert diluent (mostly nitrogen). The use of highly porous electrodes allows the relatively large volume of nitrogen to be tolerated by the electrode. One way that the art has overcome the inefficiency that arises from using a gas stream that is only 20% reactant has been to increase the pressure. The higher pressure increases the effective concentration of reactants at the electrode surface, which in turn increases the rate of electrochemical reaction. The diffusion of reactants to the catalyst surface is also facilitated by the higher pressure. The drawback to this approach is that compressors add weight and volume to the fuel cell and thus reduce both its mass energy density and volume energy density.

In order for an electrolyte to function properly, it must be hydrated while the electrochemical reaction is occurring. When a cell is operated at high temperature and/or pressure, it is difficult to maintain hydration; water tends to be evaporated from the electrolyte. As a result, many cells of the art require external sources of humidification in order to provide stable and efficient performance at reasonable power levels. All of these systems—heaters, hydrators, and compressors—add weight and volume to the fuel cell, detract from its power density and increase its complexity. Thus, important features of an efficient, and therefore practical, fuel cell are (1) that it can employ ambient air as its oxygen source; (2) that it be efficient at ambient temperature and pressure, i.e. that it not require external heating or pressurization; and (3) that it operate without external humidification of gases. The porous gas electrodes of the present invention allow the construction of a cell that meets all of these requirements.

SUMMARY OF THE INVENTION

In one aspect the invention relates to a porous gas diffusion electrode comprising: (a) an electronically conductive porous body in electrical contact with (b) a catalyst layer comprising (i) a catalyst dispersed on the surface of a carbon support; (ii) a water-insoluble sulfonated polystyrene, sulfonated poly($\alpha$-methylstyrene) or sulfonated styrene-ethylene-butylene-styrene (SEBS) block copolymer; and (iii) a nonionic fluorocarbon polymer. Preferred sulfonated polystyrenes, poly($\alpha$-methylstyrene)s and SEBS's have a conductivity of 0.04 S/cm or greater, a molecular weight from 30,000 to 1,000,000, and are 10 to 60 mole percent sulfonated. The term water-insoluble, as used herein, refers to polymer electrolytes whose solubility in water at 23° C. is less than 15% by weight. In a presently most preferred embodiment, the sulfonated polystyrene is 25 to 45 mole percent sulfonated polystyrene of molecular weight 200,000 to 400,000. The nonionic fluorocarbon polymer may be chosen from the group consisting of poly(tetrafluoroethylene), poly(vinylidene fluoride), poly(tetrafluoroethylene-hexafluoropropylene), poly(hexafluoropropylene oxide), and poly(tetrafluoroethylene-hexafluoropropylene oxide). Particle sizes from 0.05 µm to 500 µm are preferred. The catalyst may be chosen from the group consisting of platinum, palladium and binary and ternary mixtures and alloys of platinum and palladium with Group VIII metals. Preferred catalysts are Pt, Pd, Pt-Ru and Pt-Co-Cr.

A preferred embodiment of the porous gas diffusion electrode comprises: (a) a porous carbon fiber sheet having a hydrophobic binder and a porosity of 30 to 70% in electrical contact with (b) a catalyst layer comprising (i) a platinum or palladium metal catalyst dispersed on the surface of a particulate carbon support at 5% to 30% by weight of the carbon support; (ii) a sulfonated polystyrene of molecular weight from 200,000 to 400,000 sulfonated to 25 to 40 mole percent; and (iii) from 15 to 30% of the total weight of the catalyst layer of a particulate poly(tetrafluoroethylene) of particle size from 50 µm to 500 µm.

In another aspect, the invention relates to a fuel cell comprising: (a) an inlet for a gaseous fuel; (b) an inlet for an oxygen-containing gas; (c) an outlet for reaction products; (d) a first gas diffusion electrode adjacent the inlet for gaseous fuel; (d) a second gas diffusion electrode adjacent the inlet for oxygen-containing gas and the outlet for reaction products; and (e) a membrane of a proton-conducting polymer between the electrodes and in contact with both. The first and second gas diffusion electrodes are each as described above. In a preferred embodiment the proton-conducting polymer membrane is a sulfonated styrene-alkylene block copolymer, preferably a sulfonated styrene-(ethylene-butylene)-styrene triblock copolymer (SEBS), and the styrene component is sulfonated to the extent of at least 25 mol %. The catalyst layer preferably comprises (i) a platinum or palladium catalyst dispersed on the surface of a particulate carbon support, (ii) a sulfonated polystyrene of molecular weight from 200,000 to 400,000 sulfonated to 25 to 40 mole percent; and (iii) from 15 to 30% of the total weight of the catalyst layer of a particulate poly(tetrafluoroethylene) of particle size from 0.05 µm to 500 µm.

In another aspect the invention relates to a method for preparing a porous gas diffusion electrode comprising:

(a) applying a suspension of 40 to 80 parts of catalyst-coated carbon particles plus 5 to 20 parts of particulate poly(tetrafluoroethylene) in 1200 parts of water to a particulate carbon paper having a hydrophobic binder and a porosity of 30 to 70% to provide a catalyst-coated carbon support;

(b) heating the catalyst-coated carbon support in an inert atmosphere at an increasing temperature from 125° C. to greater than 250° C.;

(c) cooling the catalyst-coated carbon support in an inert atmosphere to a temperature below 125° C.;

(d) applying a 5% by weight solution of sulfonated polystyrene in a solvent having a boiling point below 125° C.; and (e) drying the catalyst-coated carbon support until less than 10% solvent remains and the catalyst-coated carbon support contains from 0.2 to 2.0 mg/cm$^2$ of sulfonated polystyrene.

The gas diffusion electrodes may be employed in fabricating a fuel cell element by (a) preparing two porous gas diffusion electrodes as above; (b) providing a proton-conducting polymer membrane comprising a styrene-(ethylene-butylene)-styrene block copolymer (SEBS), the styrene component being sulfonated to the extent of at least 25 mol %; and (c) laminating the two electrodes to opposite faces of the membrane by heating at a temperature and pressure for a period of time sufficient to provide mechanically stable junctions on both faces of the membrane.

DETAILED DESCRIPTION

Figure 1:
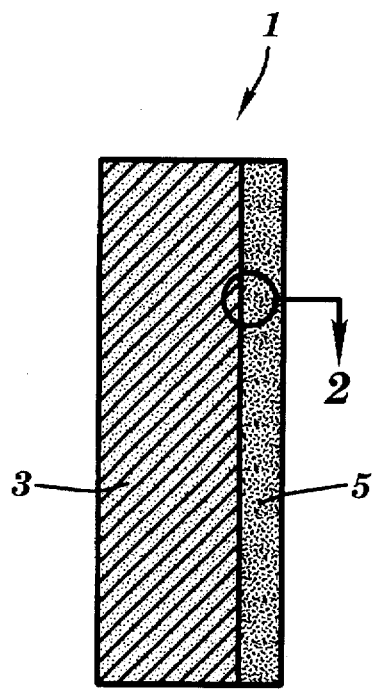
FIG. 1 is a schematic cross-section of an electrode according to the invention.

The porous gas diffusion electrode of this invention consists of a gas diffusion backing upon which a catalyst layer is applied. The catalyst layer is composed of a mixture of (1) submicron particles of noble metal on carbon black particles and (2) a nonionic fluorocarbon polymer, and this mixture is impregnated with (3) an ionic polymer having a hydrocarbon skeleton. The ionic polymer having a hydrocarbon skeleton is, for convenience, referred to below as an "ionic hydrocarbon polymer"; the same polymer is also referred to as a "hydrophilic electrolyte polymer" when reference is being made to its function.

The nonionic fluorocarbon polymer, which is hydrophobic, serves as binder for the layer and as a water repellant to keep the catalyst surface from becoming occluded by the water produced in the electrochemical reaction. Since, as explained above, water is required for the electrolyte to function, there is a balance between repelling water from the reaction and retaining water for the electrolyte. The ratio between the hydrophobic fluorocarbon polymer and the hydrophilic electrolyte polymer determines the "set point" for water retention. A major advantage of the present electrode composition is that one can separately modulate water retention and electrolyte conductivity.

The gas diffusion backing may be a porous carbon fiber sheet (e.g. Toray paper); however, backings composed of carbon cloth, carbon particulate material, carbon sheet and corrosion resistant metals, alloys, and claddings are also possible. The backing should have a porosity of more than 20% and no greater than 90%, but preferably 30% to 80% and most preferably 30% to 70%. It is necessary that the backing be highly electrically conductive in order not to significantly contribute to the voltage drop of the cell.

A presently preferred catalyst layer comprises noble metal particles (e.g. platinum, palladium) supported on carbon black particles. The chemical deposition of metals is described in U.S. Pat. No. 4,044,193. Mixtures and alloys of noble metals with other noble metals or noble metals with transition metals (copper, chromium, ruthenium, cobalt, etc.) have been reported to increase efficiency and performance (see U.S. Pat. Nos. 3,892,592 and 4,447,505) and are possible. A 1:1 alloy of platinum and ruthenium (Pt-Ru) may be well suited to use at an anode because of its resistance to poisoning. A ternary alloy of platinum, cobalt and chromium (Pt-Co-Cr), for example in the weight ratio of 50:30:20, may replace a pure platinum or palladium catalyst for many applications. Metal oxides and metalloporphyrins (e.g. cobalt), although not presently attractive from a cost-efficiency standpoint, may become practical in the future. The carbon black particles must be highly conductive so they may collect current from the electrochemical reaction. The catalyzed carbon particles are preferably sprayed on in the form of an ink, but could be brushed on, contact printed, silk screened, rolled on, or applied by any of the techniques well known in the art.

The catalyst layer must contain a nonionic fluoropolymer (e.g. PTFE) intimately mixed with the catalyzed carbon particles. The fluoropolymer acts as binder for the electrode and rejects water from electrode to prevent flooding. The fluoropolymer content of the electrode should be more than 5% but no greater than 40%, preferably 10% to 35%, and most preferably 15% to 30%. Possible fluoropolymers include poly(tetrafluoroethylene), poly(vinylidene fluoride), poly(tetrafluoroethylene-hexafluoropropylene), poly (hexafluoropropylene oxide), and poly(tetrafluoroethylene-hexafluoropropylene oxide).

The catalyzed-carbon/fluoropolymer mixture is infiltrated with an ionic hydrocarbon polymer electrolyte. The ionic hydrocarbon polymer is ideally low equivalent weight, rigid, low-to-moderately water swellable, and water insoluble, but soluble in a volatile solvent. The use of a low equivalent weight polymer electrolyte favors a higher amount of water retention. By low equivalent weight is meant that the ratio of polymer weight to equivalents of acid (in most cases, sulfonic acid) is low; i.e. the polymer is relatively highly substituted with acid groups. Under steady-state conditions the water necessary to keep the polymer electrolyte hydrated is provided by the water produced in the electrochemical reaction itself.

Partially sulfonated polystyrene is a preferred ionic hydrocarbon polymer; it may be prepared according to the procedure in U.S. Pat. No. 3,870,841. Another possible ionic hydrocarbon polymer for use in the invention is partially sulfonated poly(α-methylstyrene). Yet another possible ionic hydrocarbon polymer for use in the invention is partially sulfonated styrene-ethylene-butylene-styrene (SEBS) block copolymer, which can be prepared according to the method described in U.S. Pat. No. 5,468,574. The sulfonated SEBS must be cast by a solvent/non-solvent technique to produce inverted micelles, and the resulting gel, while it exhibits good power output, does not appear to have as long a working life in a cell as do the sulfonated styrene polymer electrolytes. The ionic conductivity of the ionic hydrocarbon polymer should be high (0.04 S/cm or greater) to allow for proton transport in the electrode and across the interface to the electrolyte. To this end, the sulfonation level of the polystyrene should be greater than 10 mol % but less than 60 mol %, preferably 25 mol % to 50 mol % and most preferably 25 mol % to 45 mol %. Very highly sulfonated polystyrene ($\geq$70%) dissolves readily in water and is unsuitable. Polystyrenes that are too highly sulfonated also retain too much water and block the pores of the electrode, thus preventing gas passage. The ionic hydrocarbon polymer may be impregnated into the structure by conventional means, such as dipping, spraying, brushing, rolling or printing.

The porous gas diffusion electrode should be easily bonded to the proton-conducting polymer electrolyte membrane and should afford good electrical contact. We have found that the hydrocarbon polymer electrolyte described above infiltrates into the electrode when laminated at a modest temperature and pressure, and that it bonds well to a hydrocarbon polymer electrolyte membrane such as the membrane described in U.S. Pat. No. 5,468,574, the disclosure of which is incorporated herein by reference. The porous gas diffusion electrode of this invention can be laminated at low temperature and pressure to hydrocarbon ionomer membranes to afford good interfacial adhesion and low interfacial resistance.

A polymeric antioxidant may be blended into the ionic hydrocarbon polymer in order to extend the operating lifetime of the electrode. Presently preferred polymeric antioxidants are low molecular weight poly(phenol-formaldehyde) resins, which are miscible with the ionic hydrocarbon polymer. The use of a poly(α-methylstyrene)-based ionic hydrocarbon polymer will also add increased oxidative stability.

In the present invention, the catalyst area available for electrochemical reaction is increased by reducing the fractional surface area blocked by the other components in the electrode, such as the polymer electrolyte and the fluoropolymer binder. This effectively increases the reaction rate at lower temperature and pressure.

In general, porous gas diffusion electrodes according to the invention are prepared by applying, at 100°–140° C., a suspension of 40 to 80 parts of catalyst-coated carbon particles plus 5 to 20 parts of particulate poly (tetrafluoroethylene) in 1200 parts of water to a particulate carbon paper having a hydrophobic binder and a porosity of 30 to 70%. The resulting catalyst-coated carbon and PTFE support is heated in an inert atmosphere at an increasing temperature from 125° C. to 380° C. and then cooled in an inert atmosphere to a temperature below 125° C. To the cooled support is applied, at 20° to 50° C., a 5% by weight solution of sulfonated polystyrene in a solvent having a boiling point below 125° C., and the support is dried until less than 10% of the solvent remains. The resulting electrode contains from 0.2 to 2.0 mg/cm$^2$ of sulfonated polystyrene.

Figure 2:
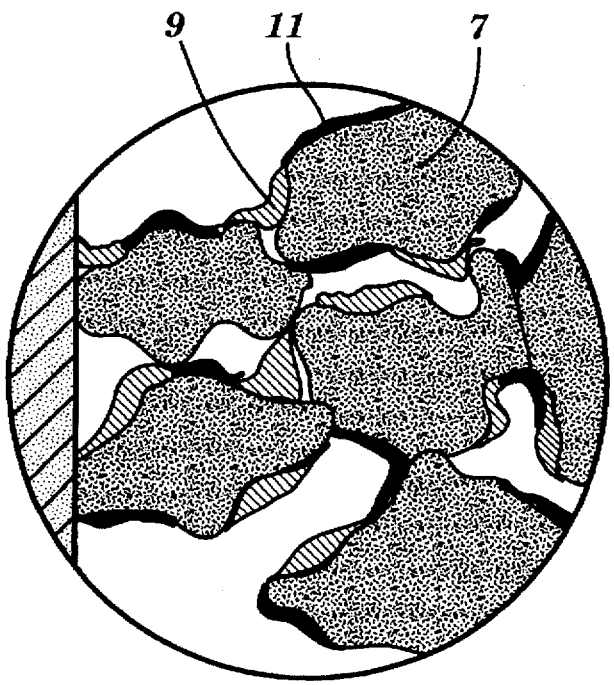
FIG. 2 is an expanded view taken along line 2 of FIG. 1.

A gas diffusion electrode according to the invention is shown in an idealized schematic cross-section in FIG. 1. The electrode 1 comprises a porous backing layer 3, and a catalyst layer 5. As shown in FIG. 2, the catalyst layer 5 comprises catalyst-coated carbon particles 7, bound together with a finely distributed nonionic fluorocarbon polymer 9 and interspersed with an ionic hydrocarbon polymer 11.

A fuel cell element is then fabricated by preparing two porous gas diffusion electrodes as above and laminating the electrodes to a membrane by heating at 50° to 70° C. and 25 to 75 bars for a period of time sufficient to provide mechanically stable junctions on both faces of the membrane. The membrane is a styrene-(ethylene-butylene)-styrene block copolymer (SEBS) with the styrene component sulfonated to the extent of at least 25 mol %.

EXAMPLES

In the examples that follow, the electrode is impregnated with a solution of partially sulfonated polystyrene, which was prepared according to U.S. Pat. No. 3,870,841, the disclosure of which is incorporated herein by reference. The hydrocarbon ionomer membrane was prepared according to the procedure described in U.S. Pat. No. 5,468,574 and its continuation, Ser. No. 08/542,474.

EXAMPLE 1

A catalyzed gas diffusion electrode was prepared as follows: A carbon ink was prepared by first dissolving 1.2 grams of nonionic surfactant (Triton X-100) in 60 grams of distilled water (2% w/w solution) in a glass jar with a teflon mixing bar. Slow agitation is used to minimize foaming and splashing. Six grams of platinum-supported carbon (Vulcan XC-72R, 20% Pt, E-tek) was added to the solution. The mixture was stirred with moderate agitation to form a viscous particle dispersion. About 60 grams of distilled water was added to reduce the viscosity, and about 1.1 grams of an aqueous PTFE dispersion (Teflon 30B, Dupont) was added. The dual particle suspension was stirred slowly until homogenous. The suspension contains about 15% by weight PTFE. A 225 cm$^2$ sheet of hydrophobized (35% PTFE) Toray paper (E-tek Corp., Waltham, Mass.) was weighed and heated on a metal platen to about 120° C. The platen was oriented at about 45°–50° C. from the normal, and the carbon ink was sprayed onto the hot substrate. It was allowed to dry. The spray-coated sheet was put in an oven which had been preheated to 125° C. and purged with dry nitrogen overnight to minimize oxygen. The oven was heated to 250° C. in 5–10 minutes and then allowed to cool to 125° C. under dry nitrogen purge. The resulting carbon electrode intermediate had a platinum loading of 0.5 mg/cm$^2$ and was not wettable by water.

A 5% by weight solution of 45% sulfonated polystyrene was prepared by mixing the polymer in an approximately 60/40 toluene/n-propanol solution. The solution was placed in a covered petri dish to a depth sufficient to cover the bottom of the dish, and the solution was heated to 28°–30° C. on a hotplate. A 5 cm$^2$ piece of the dried catalyzed-carbon electrode was inverted catalyst side down onto the surface of the solution. After about ten minutes the electrode was blotted on paper. The electrode was dried for about ten minutes under an IR lamp and weighed. The amount of ionic hydrocarbon polymer impregnated was 0.6 mg/cm$^2$. The process was repeated for the other electrode.

Two electrodes, prepared as above, were laminated to a 50 μm thick hydrocarbon ionomer membrane (DAIS 585™, 2 mil, available from DAIS Corp, Palm Harbor, Fla.) by pressing at 1 metric ton at 58° C.–60° C. for one minute.

Using air at atmospheric pressure without humidification, and with the cell running at 40° C. after about six hours of operation under load, the single cell exhibited a current density of 400 mA/cm$^2$ at 0.5 V (200 mW/cm$^2$). The iR drop of the cell under these conditions gave rise to a resistivity of 0.1 ohm-cm$^2$. At 27° C., with the cell operating under load, a current density of 300 mA/cm at 0.5 V (150 mW/cm$^2$) was measured.

EXAMPLE 2

A second cell was prepared according to the procedure described above. The second cell had a platinum loading of 0.6 mg/cm$^2$, 31% sulfonated styrene polymer loading of 0.5 mg/cm$^2$ and a 4 mil (100 μm) hydrocarbon ionomer membrane. At 40° C. this cell exhibited a current density of 300 mA/cm$^2$ at 0.5 V (150 mW/cm$^2$), and the iR drop gave rise to a resistivity of 0.25 ohm-cm$^2$.

We claim:

1. A porous gas diffusion electrode comprising:
   (a) an electronically conductive porous body; in electrical contact with
   (b) a catalyst layer comprising (i) a catalyst dispersed on the surface of a carbon support; (ii) a water-insoluble sulfonated polystyrene, sulfonated poly(α-methylstyrene) or sulfonated styrene-ethylene-butylene-styrene block copolymer; and (iii) a nonionic fluorocarbon polymer.

2. An electrode according to claim 1 wherein said sulfonated polystyrene, poly(α-methylstyrene) or sulfonated styrene-ethylene-butylene-styrene block copolymer has a conductivity of 0.04 S/cm or greater.

3. An electrode according to claim 1 wherein said sulfonated polystyrene is 10 to 60 mole percent sulfonated polystyrene of molecular weight 30,000 to 1,000,000.

4. An electrode according to claim 3 wherein said sulfonated polystyrene is 25 to 45 mole percent sulfonated.

5. An electrode according to claim 1 wherein said nonionic fluorocarbon polymer is chosen from the group consisting of poly(tetrafluoroethylene), poly(vinylidene fluoride), poly(tetrafluoroethylene-hexafluoropropylene), poly(hexafluoropropylene oxide), and poly (tetrafluoroethylene-hexafluoropropylene oxide).

6. An electrode according to claim 1 wherein said catalyst dispersed on the surface of a carbon support is chosen from the group consisting of platinum, palladium and binary and ternary mixtures and alloys of platinum and palladium with Group VIII metals.

7. An electrode according to claim 6 wherein said catalyst is chosen from the group consisting of Pt, Pd, Pt-Ru and Pt-Co-Cr.

8. A porous gas diffusion electrode according to claim 1 comprising:

(a) said porous body comprising a porous carbon fiber sheet having a hydrophobic binder and a porosity of 30 to 70%; in electrical contact with
   (b) said catalyst layer comprising (i) a platinum or palladium metal catalyst dispersed on the surface of a particulate carbon support at 5% to 30% by weight of said carbon support; (ii) a sulfonated polystyrene of molecular weight from 200,000 to 400,000 sulfonated to 25 to 40 mole percent; and (iii) from 15 to 30% of the total weight of the catalyst layer of a particulate poly(tetrafluoroethylene) of particle size from 50 μm to 500 μm.

9. A fuel cell comprising:
   (a) an inlet for a gaseous fuel;
   (b) an inlet for an oxygen-containing gas;
   (c) an outlet for reaction products;
   (d) a first gas diffusion electrode adjacent said inlet for gaseous fuel;
   (e) a second gas diffusion electrode adjacent said inlet for oxygen-containing gas and said outlet for reaction products; and
   (f) a membrane of a proton-conducting polymer between said first and second electrodes and in contact with both;

said first and second gas diffusion electrodes each comprising an electronically conductive porous body in electrical contact with a catalyst layer comprising (i) a catalyst dispersed on the surface of a particulate carbon support, (ii) a sulfonated polystyrene, poly(α-methylstyrene) or styrene-ethylene-butylene-styrene block copolymer, and (iii) a particulate nonionic fluorocarbon polymer.

10. A fuel cell according to claim 9 wherein said proton-conducting polymer membrane comprises a styrene-alkylene block copolymer, the styrene component being sulfonated to the extent of at least 25 mol%.

11. A fuel cell according to claim 10 wherein said proton-conducting membrane is a sulfonated styrene-(ethylene-butylene)-styrene block copolymer.

12. A fuel cell according to claim 9 wherein said catalyst layer comprises (i) a platinum or palladium catalyst dispersed on the surface of a particulate carbon support, (ii) a sulfonated polystyrene of molecular weight from 200,000 to 400,000 sulfonated to 25 to 40 mole percent; and (iii) from 15 to 30% of the total weight of the catalyst layer of a particulate poly(tetrafluoroethylene) of particle size from 0.05 μm to 500 μm.

* * * * *